United States Patent
Horman et al.

(10) Patent No.: US 8,549,609 B2
(45) Date of Patent: Oct. 1, 2013

(54) UPDATING FIREWALL RULES

(75) Inventors: Neil R. T. Horman, Cary, NC (US); Eric L. Paris, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 186 days.

(21) Appl. No.: 13/149,588

(22) Filed: May 31, 2011

(65) Prior Publication Data

US 2012/0311693 A1    Dec. 6, 2012

(51) Int. Cl.
*H04L 29/06* (2006.01)
*G06F 17/40* (2006.01)
*G06F 15/177* (2006.01)

(52) U.S. Cl.
USPC .................. 726/11; 726/13; 713/154

(58) Field of Classification Search
USPC ............ 726/11, 13; 713/154; 709/221, 709/232
See application file for complete search history.

(56) References Cited

U.S. PATENT DOCUMENTS

| | | | |
|---|---|---|---|
| 6,769,031 B1* | 7/2004 | Bero | 709/245 |
| 7,451,234 B1* | 11/2008 | Bonner | 709/245 |
| 2003/0005334 A1* | 1/2003 | Wesinger et al. | 713/201 |
| 2003/0177236 A1* | 9/2003 | Goto et al. | 709/225 |
| 2003/0216140 A1* | 11/2003 | Chambert | 455/426.1 |
| 2005/0091311 A1* | 4/2005 | Lund et al. | 709/203 |
| 2005/0268335 A1* | 12/2005 | Le et al. | 726/13 |
| 2007/0088815 A1* | 4/2007 | Ma et al. | 709/224 |
| 2007/0271453 A1* | 11/2007 | Pohja et al. | 713/153 |
| 2008/0052758 A1* | 2/2008 | Byrnes | 726/1 |
| 2008/0148380 A1* | 6/2008 | Abzarian et al. | 726/11 |
| 2008/0320111 A1* | 12/2008 | Yan et al. | 709/220 |
| 2009/0106453 A1* | 4/2009 | Miura | 709/245 |
| 2009/0177786 A1* | 7/2009 | Takahashi | 709/228 |
| 2010/0281146 A1* | 11/2010 | Lee | 709/221 |
| 2010/0312875 A1* | 12/2010 | Wilerson et al. | 709/224 |
| 2010/0333165 A1* | 12/2010 | Basak et al. | 726/1 |
| 2011/0302647 A1* | 12/2011 | Bhattacharya et al. | 726/11 |

OTHER PUBLICATIONS

Belimpasakis, P. et al. "Home DNS: Experiences with Seamless Remote Access to Home Services", 2007.*
Vixie, P. et al. "Dynamic Updates in the Domain Name System (DNS Update)", RFC2136, Apr. 1997.*
Willington, B. "Secure Domain Name System (DNS) Dynamic Update", RFC3007, Nov. 2000.*

* cited by examiner

*Primary Examiner* — Michael Simitoski
(74) *Attorney, Agent, or Firm* — Lowenstein Sandler LLP

(57) ABSTRACT

A host rule mapping module in a firewall server may receive an update notification from a name server. The update notification may indicate a change to an address associated with a host name of a host machine. In response to receiving the update notification, the host rule mapping module may request a record corresponding to the host name identified in the update notification. The host rule mapping module may receive a contents of the record in response to the request from the name server, and update a firewall rule corresponding to the address identified in the update notification to include the contents of the record.

21 Claims, 6 Drawing Sheets

DNS Record 472

| Key | Value |
|---|---|
| Host A | Allow forward port 80 |
| Host B | Allow forward port 25 |

Fig. 4B

Firewall Rules 232

| IP Address | Rule |
|---|---|
| X | Forward port 80 |
| Y | Forward port 25 |

Fig. 4C

UPDATING FIREWALL RULES

TECHNICAL FIELD

This disclosure relates to the field of computer security and, in particular, to updating firewall rules in a stateless IPv6 autoconfiguration environment.

BACKGROUND

A firewall is a device, or a piece of software running on a device, used to permit or deny network transmissions based upon a set of rules. A firewall may be used to protect a network from unauthorized access while permitting legitimate communications to pass. A firewall may have an outward side facing a global network, such as the Internet. The opposite side of the firewall may be a private network which is protected by the firewall. The private network may include any number of host machines (e.g., computers) each addressable by its own IP address. The physical construction of the network may be such that all data packets intended for one of the IP addresses behind the firewall pass through the firewall. Using the firewall rules, which may be set by a network administrator or other user, the firewall may determine whether to allow or deny certain data packets and/or determine where to route particular data packets based on the IP addresses to which the packets are directed. The determination of where to route data packets may be done using the IP addresses of the host machines in the private network.

Depending on the addressing scheme used by the network, the IP addresses of the host machines may be static or dynamic. Static IP addresses do not change over time, and thus once they are set in the firewall rules, there is no need to update them. The Internet Protocol version Four (IPv4) addressing system commonly uses static addressing, while IPv6 may use dynamic addressing. Dynamic IP addresses may change over time and thus, there is a need to update the firewall rules as changes occur. Manually updating the firewall rules can be a long and expensive undertaking, particularly if the number of host machines in the network is large. In addition, if the update is not performed soon after the change, the possibility exists that data packets intended for one host machine at a certain IP address, which has now been assigned to a different host machine, may be routed to the incorrect destination. Conventional firewalls are configured using only IP addresses and, thus, there is no way to verify that an IP address is still associated with the intended host machine.

BRIEF DESCRIPTION OF THE DRAWINGS

The present disclosure is illustrated by way of example, and not by way of limitation, in the figures of the accompanying drawings.

FIG. 4B is a block diagram illustrating a DNS record, according to an embodiment.

FIG. 4C is a block diagram illustrating a firewall rule table, according to an embodiment.

DETAILED DESCRIPTION

Figure 1:
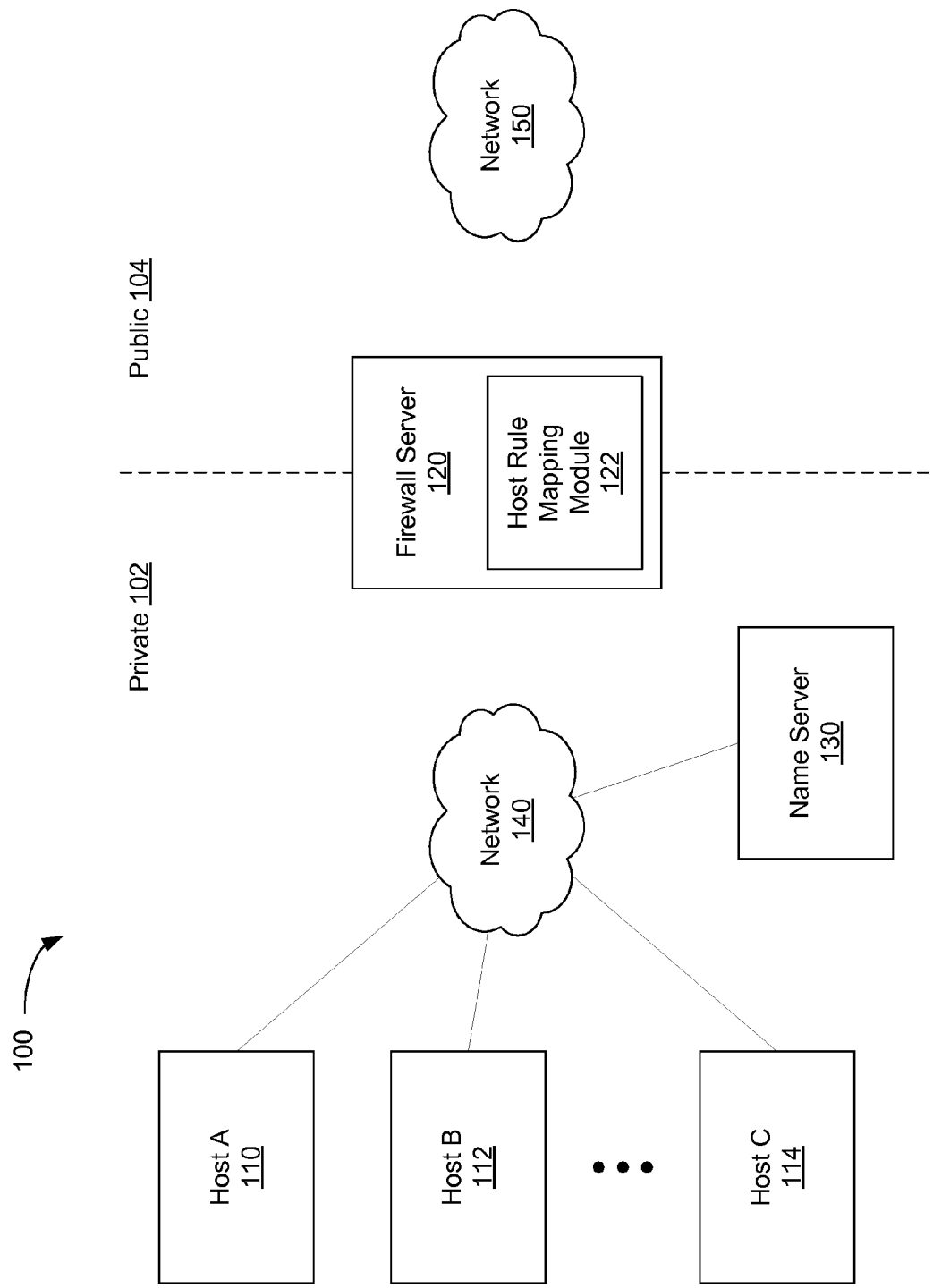
FIG. 1 is a block diagram illustrating a network environment for updating firewall rules, according to an embodiment.

The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

Embodiments are described for updating firewall rules in a computer network. A firewall, using a set of firewall rules, may determine whether to allow or deny certain data packets received at the firewall and/or determine where to route particular data packets. The determination of where to route data packets may be done using the IP addresses of the host machines in the private network. Under certain addressing protocols, the IP addresses of the host machines may change over time. The host machines may be configured to automatically update a name server in the network to identify the change to the IP address. The name server may provide an update notification to the firewall indicating a change to an address associated with a host name of a host machine. A host rule mapping module in the firewall may receive the update notification and request a record corresponding to the host name identified in the update notification. The host rule mapping module may receive contents of the record in response to the request and update a firewall rule corresponding to the address identified in the update notification to include the contents of the record.

In prior systems, one host machine, such as web server, may be configured with a first IP address. The network firewall would be manually configured to allow web server traffic to the first IP address, knowing that the first IP address currently belongs to the web server. A problem occurs, however, if the first host machine is shut down and a second host machine, such as an email server, is booted and configures itself with the first IP address. The firewall would be unaware of this change and would allow web server traffic to pass through to the email server. Embodiments of the present invention allow the firewall to receive notifications from a name server indicating that the IP address for a given host name (e.g., the web server) has been updated. The firewall queries the name server for a record corresponding to the host name and receives the content of the record, which includes a rule for that host. The firewall can then associate the rule for the web server with the new IP address. This allows the firewall to verify that the data packets should be forwarded to a certain IP address and that the IP address corresponds to the proper host machine. This prevents packets from being forwarded blindly to the IP address stated in the firewall rules, even though that IP address may no longer correspond to the intended host machine.

FIG. 1 is a block diagram illustrating a network environment for updating firewall rules, according to an embodiment of the present invention. In one embodiment, network environment 100 includes one or more host machines 110, 112, 114, firewall server 120 and name server 130. Host machines 110, 112, 114, firewall server 120 and name server 130 may be connected through a network 140, which may be, for example, a local area network (LAN), or other network. In another embodiment, each device may have a direct connection to each of the other devices in the network. The illustrated embodiment shows three host machines 110, 112, 114, however, in other embodiments, there may be any number of host machines and network environment 100 may include additional or different devices.

Each of host machines 110, 112, 114 may be, for example, a conventional personal computer (PC), workstation, laptop computer, mobile phone, personal digital assistant (PDA) or the like. In one embodiment, each of host machines 110, 112, 114 may have a designated purpose, such as a web server, an email server, etc. In one embodiment, each of host machines 110, 112, 114 may be identified on network 140 by a host name and an internet protocol (IP) address. The host name (or domain name) may be a name of the device, making it identifiable to other devices and users on network 140, and may be descriptive of the function or purpose of the device. The IP address may be a numerical value indicating the location of the device and provide an address to which communications intended for the device may be sent. One addressing system, Internet Protocol version Six (IPv6), uses a 128 bit binary number for the IP address. IPv4 uses a 32 bit binary number. Embodiments of the present invention may be used in systems using IPv6, IPv4, or some other addressing system.

In one embodiment, name server 130 may be a Domain Name System (DNS) server. DNS may be used to translate human-readable computer host names into IP addresses. Thus, name server 130 may maintain a distributed database, or other data structure, which stores the relationship between the host names (e.g., Host A, Host B, Host C) of host machines 110, 112, 114 in network 140 and the corresponding IP addresses. The relationship may include mapping information for which IP addresses are associated with each host name. In older versions of the Internet Protocol, such as IPv4, host machines were assigned static IP addresses that did not change over time. Each host machine may have been assigned an IP address by a network administrator or automatically by a Dynamic Host Configuration Protocol (DHCP) server. Regardless of how the IP address was assigned, each host machine was normally given the same IP address each time it requested one and thus, the address stored in the name server 130 for each host name was almost always accurate.

New versions of the Internet Protocol, such as IPv6, however, may include a different IP address configuration protocol known as Stateless Logic Address Autoconfiguration (SLAAC). Using SLAAC, IPv6 hosts, such as host machines 110, 112, 114, can configure their own IP address automatically when connected to network 140 using Internet Control Message Protocol version Six (ICMPv6) router discovery messages. When first connected to network 140, each of host machines 110, 112, 114 may send a link-local router solicitation multicast request for its configuration parameters. If configured suitably, a router (not shown) may respond to such a request with a router advertisement packet that contains network-layer configuration parameters. Host machines 110, 112, 114 may use the configuration parameters to compute their own unique IP addresses. This process may occur each time the host machine connects to network 140. Thus, any time one of host machines 110, 112, 114 are rebooted or experience a state change, it may automatically configure its own, potentially new and different, IP address. Therefore, the previous IP address associated with the host name in name server 130, may be no longer valid.

Dynamic DNS is a network service that allows networked devices, such as host machines 110, 112, 114 to notify name server 130 of a change in the IP address associated with a particular host name. This service is particularly useful for an IPv6 host which has a variable, and potentially often changing, IP address. Dynamic DNS may include a software client program running on host machines 110, 112, 114 that automates the discovery and registration of the hosts' public IP addresses. The client program connects to name server 130, through network 140, and causes name server 130 to link the discovered public IP address of the host machine with a host name in the Domain Name System. These services can function by a number of mechanisms, such as for example, a hypertext transfer protocol (HTTP) service request, since even restrictive network environments usually allow HTTP service. Dynamic DNS is thus useful to keep the database, or other data structure, maintained by name server 130, up to date with the constantly changing IP addresses of host machines 110, 112, 114.

Dynamic DNS may also optionally implement a timer functionality to limit the amount of time that an IP address is valid. The timer functionality may require that the Dynamic DNS service send an update of the IP address for the host machine every so often, such that the update is received by name server 130 before the expiration of a pre-established time period (e.g., a time-to-live value). If the name server does not receive a notification from the host machine in the set time period, the name server may remove the association between the host name and the IP address. This change would be pushed up to the firewall server, so that the firewall can handle network traffic intended for that host correctly (e.g., drop the data packets). This ensures that if a host machine suffers an error or is turned off, network traffic will no longer be routed to its IP address. Additionally, in the event that another host configures itself with the IP address of the first host, that network traffic intended for the first host will not be incorrectly routed to the second host. The time-to-live value may be configurable by a system administrator or may have a default value set, for example, at fifteen minutes.

Firewall server 120 may be a standalone physical machine (e.g., a computer), part of some other server device, or a piece of software running on a device, that implements firewall protections. Firewall server 120 may be used to permit or deny network transmissions based upon a set of rules. In one embodiment, firewall server 120 may be used to protect network 140 from unauthorized access while permitting legitimate communications to pass. Firewall server 120 may effectively divide network environment 100 into two networks: private network 102 and public network 104. Private network 102 may include network 140, host machines 110, 112, 114 and name server 130. Public network 104 may include any number of other devices and/or networks and is represented here by network 150. Network 150 may be another LAN, a wide area network (WAN), a global area network (GAN) such as the Internet, or a combination of such networks.

Firewall server 120 may receive data packets through network 150, and make a determination based on a set of firewall rules, whether to allow the data packets through and where to route them. The data packets may be received by firewall server 120 on a certain port for private network 102. Each port may be a designated communications endpoint and may have a corresponding port number. Common port numbers may include port 80 used for HTTP in web traffic and port 25 used for simple mail transfer protocol (SMTP) with email traffic. One example of a set of firewall rules is shown in FIG. 4C. FIG. 4C is a block diagram illustrating a firewall rule table 232, according to an embodiment of the present invention.

Figure 2:
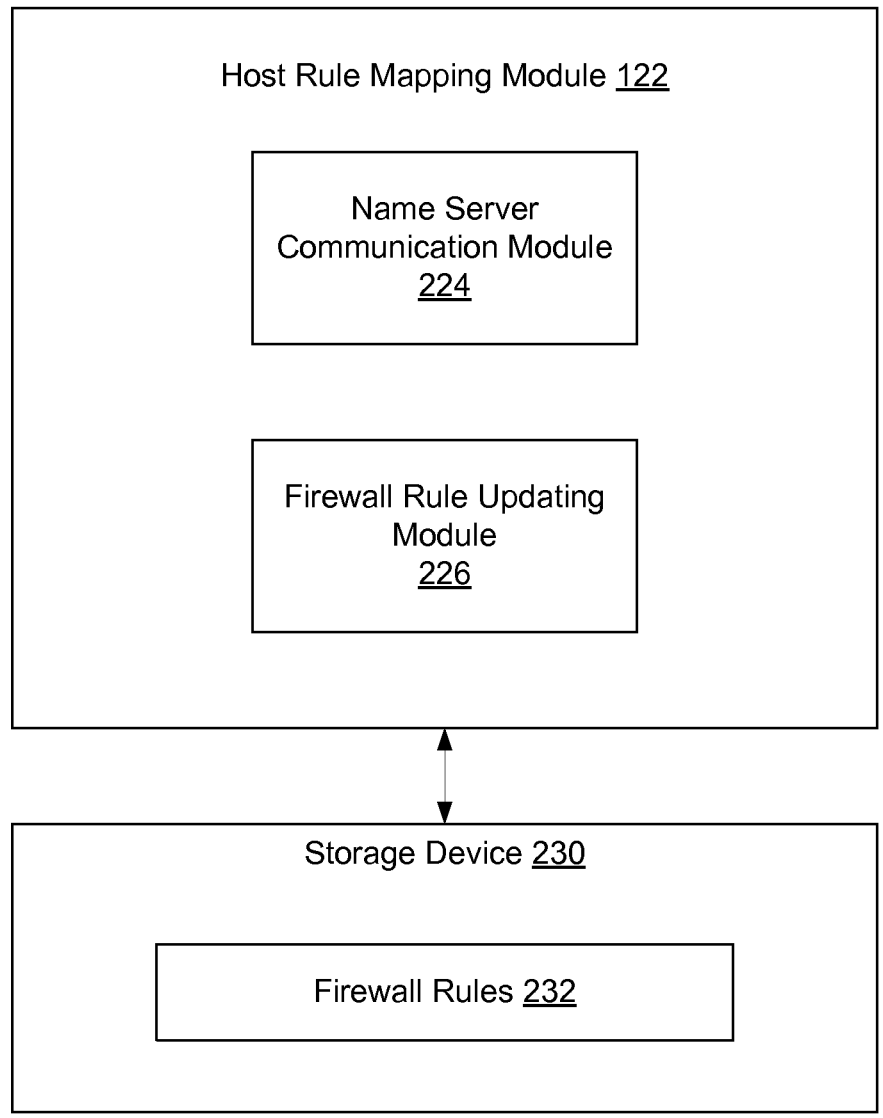
FIG. 2 is a block diagram illustrating a host rule mapping module, according to an embodiment.

Firewall server 120 may store the firewall rules 232 in a data storage device, such as 230 shown in FIG. 2, and may use a table, database or any other data structure. Firewall rules may include any set of instructions or limitations that define the behavior of the firewall rule and direct the firewall server to allow, deny or route network traffic to a certain destination depending on any number of factors. The factors may include, the type of data, the sender of the data, the intended destination of the data, or other factors. In the example shown in FIG. 4C, the table 232 includes a list of IP addresses and corresponding rules regarding data packets received at certain ports. For example, data packets received on port 80 (HTTP) may be forwarded to the IP address X. The IP address X may be associated with one of host machines 110, 112, 114 that is functioning as a web server. In another example, data packets received on port 25 (SMTP) may be forwarded to the IP address Y, which may be associated with one of host machines 110, 112, 114 functioning as an email server. In other embodiments, there may be additional IP addresses contained in firewall rules 232 and/or additional rules for each of the IP addresses. However, host machines 110, 112, 114 may have reconfigured their IP addresses, using SLAAC as discussed above, and the IP address X may no longer be associated with the host machine functioning as a web server. Thus, the data packets would be directed by firewall server 120 to the wrong host machine (or no host machine). Host rule mapping module 122, in firewall server 120, allows firewall server 120 to update firewall rules 232 to reflect changes in the IP addresses of host machines 110, 112, 114. This ensures that the data packets are routed to the intended network device.

FIG. 2 is a block diagram illustrating a host rule mapping module, according to an embodiment of the present invention. In one embodiment, host rule mapping module 122 may include name server communication module 224 and firewall rule updating module 226. Host rule mapping module 122 may be coupled to a storage device 230 which includes firewall rules 232, as discussed above. Storage device 230 may be part of firewall server 120 or may be part of another device in network environment 100 and may be, for example, memory, such as read-only memory (ROM), flash memory, random access memory (RAM), etc., or a mass storage device, such as a magnetic or optical storage device.

Name server communication module 224 may be configured to communicate with name server 130. The communication may occur over network 140. In one embodiment, the communications may include update notifications, sent by name server 130, to notify firewall server 120 of changes in the IP addresses for host machines 110, 112, 114. As discussed above, through SLAAC, host machines 110, 112, 114 may automatically configure their own IP addresses and, using Dynamic DNS, update name server 130 with the new IP address. Name server 130 may store the new IP address with the corresponding host name. Name server 130 may be configured to generate and provide a zone update notification to other devices. A DNS zone is a portion of the global DNS namespace for which administrative responsibility has been delegated. Through the zone update notification, name server 130 is able to propagate the updated IP address and host name information to other devices in the zone. In one embodiment, the zone update notification may include providing the information to name server communication module 224 in host rule mapping module 122 of firewall server 120. Name server 130 may send the zone update notification to firewall server 120 automatically each time a Dynamic DNS update is received from one of host machines 110, 112, 114. In one embodiment, the zone update notification may also include an indication that a host machine timed out, as discussed above, and that the IP address associated with that host machine should be removed from the firewall rules. In other embodiments, some other replication/update mechanism may be used to notify firewall server 120 of the change in name server 130.

In one embodiment, the zone update notification received by name server communication module 224 from name server 130 may include a host name for one of host machines 110, 112, 114 and an updated IP address corresponding to the host name. In response to receiving the zone update notification, name server communication module 224 may query name server 130 for a DNS record corresponding to the host name contained in the zone update notification. One type of DNS record, known as AAAA, may include the 128 bit IPv6 address associated with the host name. Another type of record, the TXT record, may contain human readable text. In one embodiment, the TXT record may be part of a database formed with key-value pairs. One example of a TXT record is shown in FIG. 4B. FIG. 4B is a block diagram illustrating a DNS record, according to an embodiment of the present invention. In DNS record 472, which may be a TXT record, the key may be a host name (e.g., Host A, Host B) and the value may a string of data, in this case used to express a firewall rule. In DNS record 472, for Host A, the rule includes "allow forward port 80." This rule indicates that data received by firewall server 120 on port 80 (HTTP) should be allowed to pass through to Host A, which may be functioning as a web server. In DNS record 472, for Host B, the rule includes "allow forward port 25." This rule indicates that data received by firewall server 120 on port 25 (SMTP) should be allowed to pass through to Host B, which may be functioning as an email server. In response to the query sent by name server communication module 224, name server 130 may return the contents of the corresponding TXT record (i.e., the firewall rule). The firewall rules in DNS record 472 may be written by a network administrator or other user. In other embodiments, the DNS record may contain additional and/or different entries and may contain different and/or additional rules for each host name entry.

In one embodiment, name server communication module 224 may receive the firewall rule from name server 130 in response to the query and provide the information to firewall rule updating module 226. Firewall rule updating module 226 may be configured to update firewall rules 232 with the new rule received from name server 130. Firewall rule updating module 226 may write the new rule to firewall rules 232 in storage device 230, potentially overwriting a previous rule stored in firewall rules 232 for the corresponding IP address. Updating the firewall rules in this manner allows the rules to be dependent on both the host name and IP address of the destination device. For example, if firewall server 120 receives data packets on port 80 (HTTP) directed to a certain IP address, firewall server 120 is able to verify that the data packets should be forwarded to that IP address (e.g. Address X) and that that IP address corresponds to the proper host machine (e.g., host name Host A functioning as a web server). This prevents packets from being forwarded blindly to the IP address stated in the firewall rules, even though that IP address may no longer correspond to the correct host machine.

Figure 3:
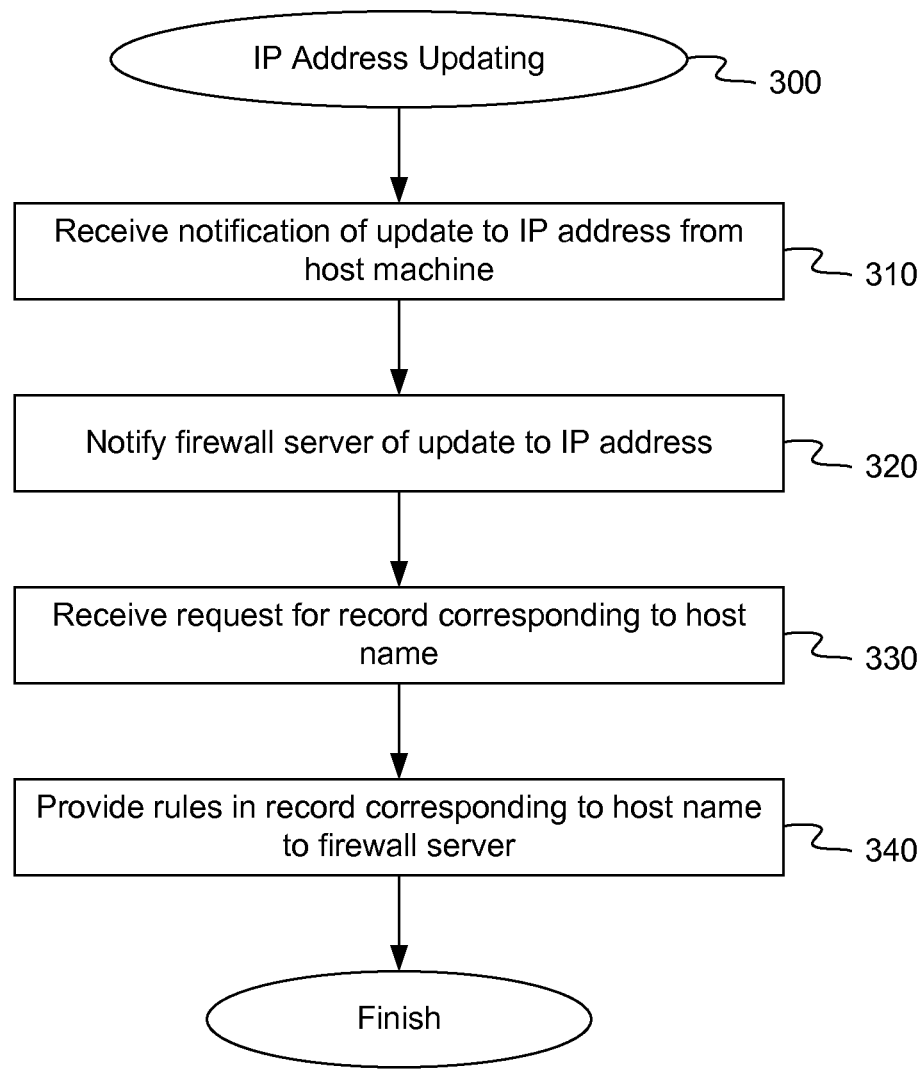
FIG. 3 is a flow diagram illustrating an IP address updating method, according to an embodiment.

FIG. 3 is a flow diagram illustrating an IP address updating method, according to an embodiment of the present invention. The method 300 may be performed by processing logic that comprises hardware (e.g., circuitry, dedicated logic, programmable logic, microcode, etc.), software (e.g., instructions run on a processing device to perform hardware simulation), or a combination thereof. The processing logic is configured to automatically update the IP address of a host machine and notify other network devices of the update. In one embodiment, method 300 may be performed by and name server 130, as shown in FIG. 1.

When a host machine, such as host machine 110, 112, 114, is booted or otherwise connects to a network, such as network 140, the host machine may automatically configure its own IP address. Using SLAAC, IPv6 hosts, such as host machines 110, 112, 114, can configure their own IP address automatically by sending a request for configuration parameters and computing a unique IP address based on the configuration parameters. Referring to FIG. 3, at block 310, method 300 receives a notification of the update to the IP address of the host machine. The Dynamic DNS service, running in the host machine, may connect to name server 130, through network 140, and cause name server 130 to associate the discovered IP address of the host machine with a host name in the Domain Name System. Name server 130 may store the information corresponding to the host name and IP address in a table or other data structure. At block 320, method 300 notifies a firewall, such as firewall server 120 of the update to the IP address for the host machine. Name server 130 may be configured to generate and provide a zone update notification to name server communication module 224 in host rule mapping module 122 of firewall server 120. Name server 130 may send the zone update notification to firewall server 120 automatically each time a Dynamic DNS update is received from one of host machines 110, 112, 114 at block 310. In other embodiments, some other replication/update mechanism may be used to notify firewall server 120 of the change in name server 130.

At block 330, method 300 receives a requests a record from firewall server 120 corresponding to the host name received in the notification at block 310. In one embodiment, the request is for a TXT record, such as record 472, corresponding to the host name. The TXT record 472 may include a firewall rule corresponding to the received host name. At block 340, method 300 provides the firewall rule from the TXT record corresponding to the host name to firewall server 120.

Figure 4A:
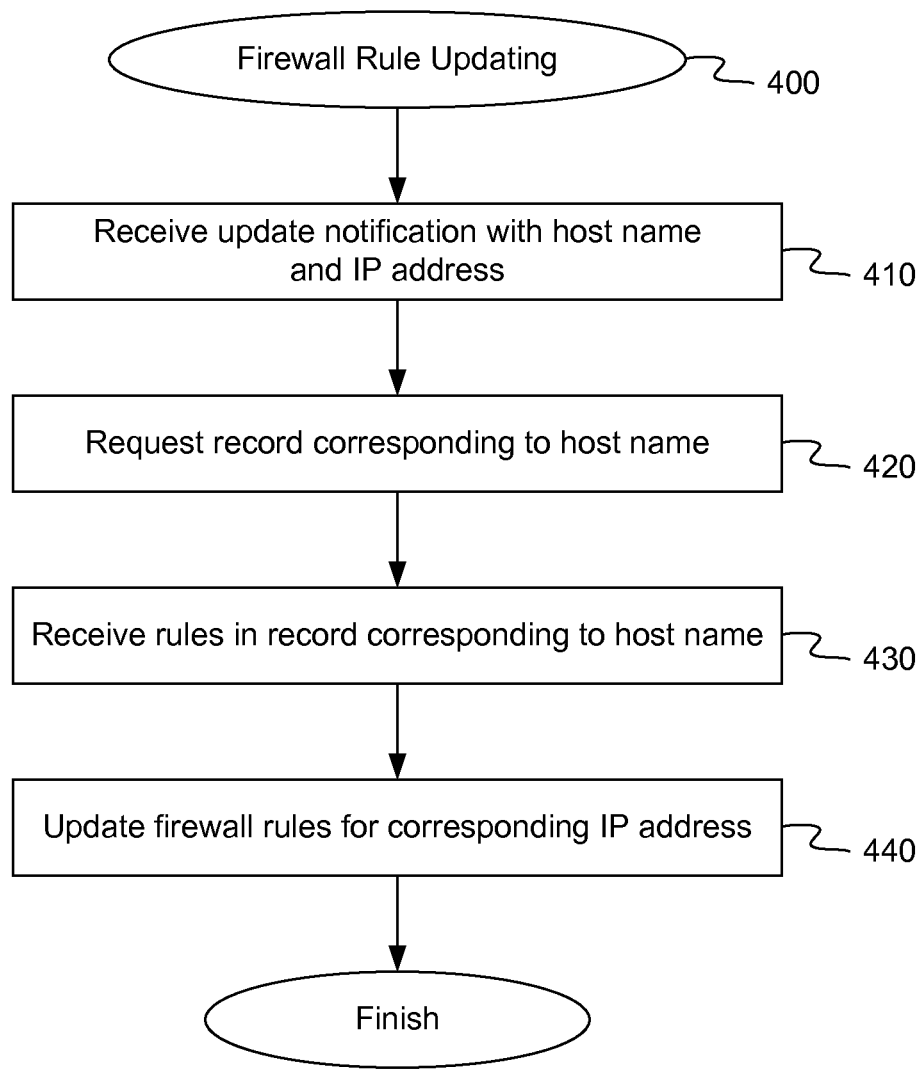
FIG. 4A is a flow diagram illustrating a firewall rule updating method, according to an embodiment.

FIG. 4A is a flow diagram illustrating a firewall rule updating method, according to an embodiment of the present invention. The method 400 may be performed by processing logic configured to automatically update the firewall rules for a network in response to a change in the IP address of a host machine. In one embodiment, method 400 may be performed by host rule mapping module 122, as shown in FIGS. 1 and 2.

Referring to FIG. 4A, at block 410, method 400 receives a zone update notification including the updated host name and IP address. As discussed above with respect to FIG. 3, the zone update notification may be sent by name server 130 in response to a change in the IP address of one of host machines 110, 112, 114. The zone update notification may be received by name server communication module 224 in host rule mapping module 122 of firewall server 120. At block 420, method 400 requests a record corresponding to the host name received in the update notification at block 410. In one embodiment, name server communication module 224 may request a TXT record, such as record 472, corresponding to the host name from name server 130. The TXT record 472 may include a firewall rule corresponding to the received host name.

At block 430, method 400 receives the firewall rule from the TXT record corresponding to the received host name. Name server communication module 224 may receive the rule in response to the request made at block 420 and may provide that information to firewall rule updating module 226. At block 440, method 400 updates the firewall rules, such as rules 232, corresponding to the IP address received in the notification at block 410. Firewall rule updating module 226 may be configured to update firewall rules 232 with the new rule received from name server 130. Firewall rule updating module 226 may write the new rule to firewall rules 232 in storage device 230. This method ensures that the firewall rules 232 for a particular IP address are intended to apply to the host machine to which the IP address is currently assigned. Thus, data packets received by firewall server 120 may be routed to the intended host machine since it is known that the host name of the intended host machine is properly associated with the destination IP address.

Figure 5:
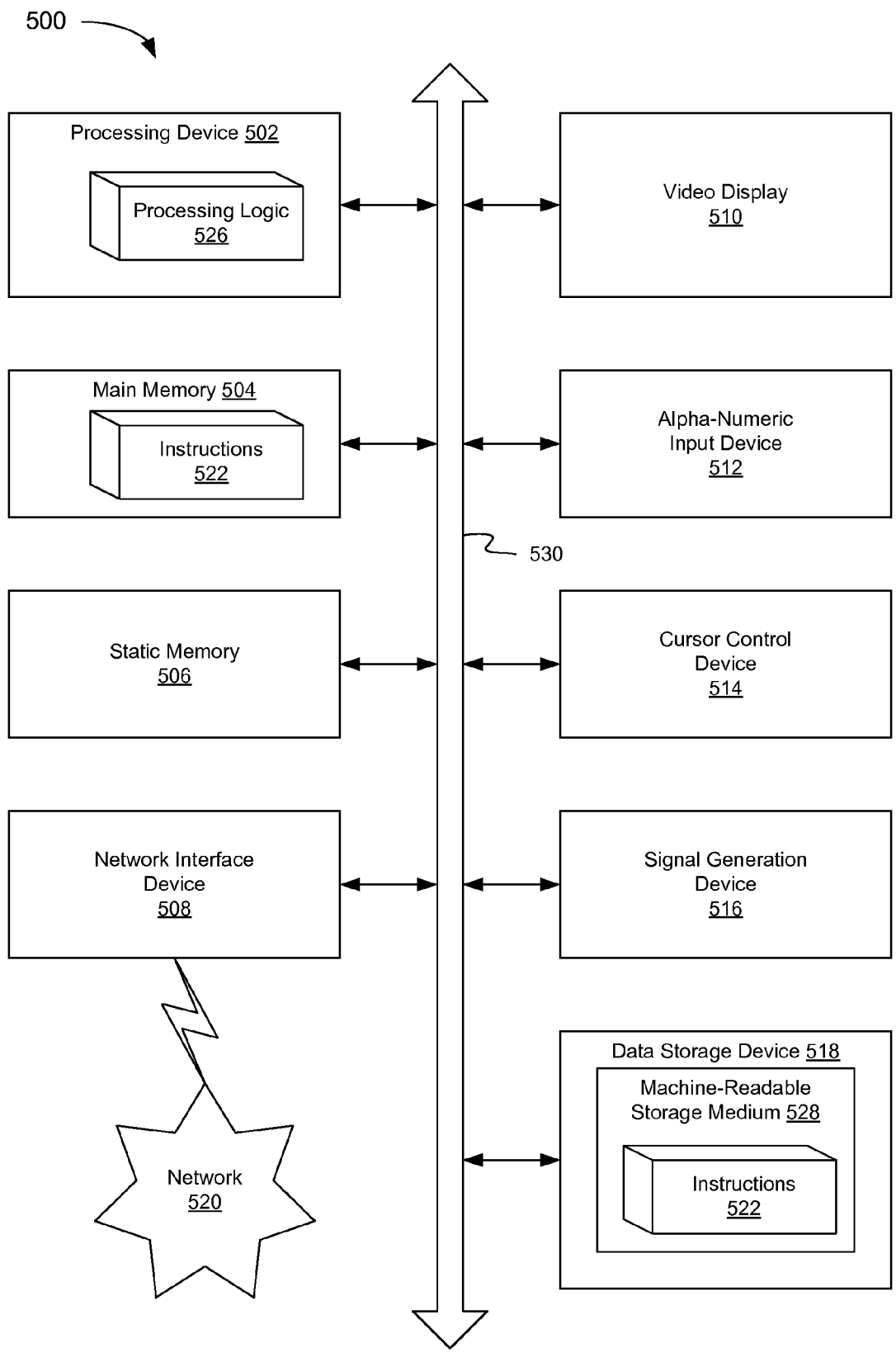
FIG. 5 is a block diagram illustrating one embodiment of a computer system, according to an embodiment.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 500 may be representative of one of host machines 110, 112, 114, firewall server 120 and/or name server 130.

The exemplary computer system 500 includes a processing device 502, a main memory 504 (e.g., read-only memory (ROM), flash memory, dynamic random access memory (DRAM) (such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 530. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute processing logic 526 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a machine-accessible storage medium 528, on which is stored one or more set of instructions 522 (e.g., software) embodying any one or more of the methodologies of functions described herein. The instructions 522 may also reside, completely or at least partially, within the main memory 504 and/or within the processing device 502 during execution thereof by the computer system 500; the main memory 504 and the processing device 502 also constituting machine-accessible storage media. The instructions 522 may further be transmitted or received over a network 520 via the network interface device 508.

The machine-readable storage medium 528 may also be used to store instructions to perform a method of updating firewall rules as described above, and/or a software library containing methods that call the above applications. While the machine-readable storage medium 528 is shown in an exemplary embodiment to be a single medium, the term "machine-readable storage medium" should be taken to include a single medium or multiple media (e.g., a centralized or distributed database, and/or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

What is claimed is:

1. A method, comprising:
   receiving an update notification from a name server, the update notification indicating a change to an address associated with a host name of a host machine;
   requesting, by a firewall server in response to receiving the update notification, a record corresponding to the host name identified in the update notification;
   receiving a content of the record in response to the request from the name server, the content comprising a firewall rule associated with the host name; and
   updating, by the firewall server, a firewall rule entry corresponding to the address identified in the update notification to include the firewall rule associated with the host name from the record.

2. The method of claim 1, wherein the record corresponding to the host name comprises a TXT record in the Domain Name System (DNS).

3. The method of claim 1, wherein the record corresponding to the host name comprises text describing a firewall rule associated with the host name.

4. The method of claim 1, wherein the address comprises an Internet Protocol version Six (IPv6) address.

5. The method of claim 1, wherein the name server is to store mapping information for the address and the host name of the host machine.

6. The method of claim 5, wherein the update notification is sent by the name server automatically in response to the name server receiving a Dynamic DNS message from the host machine, the message indicating a change to the address.

7. The method of claim 1, wherein updating a firewall rule entry comprises writing the contents of the record into a data structure at a location associated with the address, wherein the firewall server uses the data structure to make a routing determination for received data packets.

8. A system comprising:
   a processing device;
   a memory coupled to the processing device; and
   a host rule mapping module, executed by the processing device from the memory, to:
   receive an update notification from a name server, the update notification indicating a change to an address associated with a host name of a host machine,
   request, by a firewall server in response to receiving the update notification, a record corresponding to the host name identified in the update notification,
   receive a content of the record in response to the request from the name server, the content comprising a firewall rule associated with the host name, and
   update, by the firewall server, a firewall rule entry corresponding to the address identified in the update notification to include the firewall rule associated with the host name from the record.

9. The system of claim 8, wherein the record corresponding to the host name comprises a TXT record in the Domain Name System (DNS).

10. The system of claim 8, wherein the record corresponding to the host name comprises text describing a firewall rule associated with the host name.

11. The system of claim 8, wherein the address comprises an Internet Protocol version Six (IPv6) address.

12. The system of claim 8, wherein the name server is to store mapping information for the address and the host name of the host machine.

13. The system of claim 12, wherein the update notification is sent by the name server automatically in response to the name server receiving a Dynamic DNS message from the host machine, the message indicating a change to the address.

14. The system of claim 8, wherein the host rule mapping module is to update a firewall rule entry by writing the contents of the record into a data structure at a location associated with the address, wherein the firewall server uses the data structure to make a routing determination for received data packets.

15. A non-transitory machine-readable storage medium storing instructions which, when executed, cause a data processing system to perform operations comprising:
   receiving an update notification from a name server, the update notification indicating a change to an address associated with a host name of a host machine;
   requesting, by a firewall server in response to receiving the update notification, a record corresponding to the host name identified in the update notification;
   receiving a content of the record in response to the request from the name server, the content comprising a firewall rule associated with the host name; and
   updating, by the firewall server, a firewall rule entry corresponding to the address identified in the update notification to include the firewall rule associated with the host name from the record.

16. The storage medium of claim 15, wherein the record corresponding to the host name comprises a TXT record in the Domain Name System (DNS).

17. The storage medium of claim 15, wherein the record corresponding to the host name comprises text describing a firewall rule associated with the host name.

18. The storage medium of claim 15, wherein the address comprises an Internet Protocol version Six (IPv6) address.

19. The storage medium of claim 15, wherein the name server is to store mapping information for the address and the host name of the host machine.

20. The storage medium of claim 19, wherein the update notification is sent by the name server automatically in response to the name server receiving a Dynamic DNS message from the host machine, the message indicating a change to the address.

21. The storage medium of claim 15, wherein updating a firewall rule entry comprises writing the contents of the record into a data structure at a location associated with the address, wherein the firewall server uses the data structure to make a routing determination for received data packets.

* * * * *